(12) United States Patent
Sinha et al.

(10) Patent No.: US 11,195,054 B2
(45) Date of Patent: Dec. 7, 2021

(54) AUTOMATED DETERMINATION OF MATERIAL IDENTIFIERS FOR MATERIALS USING MACHINE LEARNING MODELS

(71) Applicant: SAP SE, Walldorf (DE)

(72) Inventors: Kirti Sinha, Delhi (IN); Mayank Tiwary, Rourkela (IN); Talwinder Singh, Gurugram (IN)

(73) Assignee: SAP SE, Walldorf (DE)

( * ) Notice: Subject to any disclaimer, the term of this patent is extended or adjusted under 35 U.S.C. 154(b) by 150 days.

(21) Appl. No.: 16/680,200

(22) Filed: Nov. 11, 2019

(65) Prior Publication Data

US 2021/0142109 A1     May 13, 2021

(51) Int. Cl.
*G06K 9/62*     (2006.01)
*G06N 3/04*     (2006.01)
*G06N 3/08*     (2006.01)

(52) U.S. Cl.
CPC ......... *G06K 9/6257* (2013.01); *G06N 3/0454* (2013.01); *G06N 3/08* (2013.01); *G06K 2209/17* (2013.01); *G06K 2209/19* (2013.01)

(58) Field of Classification Search
CPC ............ G06K 9/6257; G06K 2209/17; G06K 2209/19; G06N 3/0454; G06N 3/08

USPC ........................................................ 382/157
See application file for complete search history.

(56) References Cited

U.S. PATENT DOCUMENTS

| | | | |
|---|---|---|---|
| 7,761,391 B2 | 7/2010 | Schmidtler et al. | |
| 9,171,057 B2 | 10/2015 | Botros | |
| 9,316,537 B2* | 4/2016 | Bamber | B07C 5/3416 |
| 10,268,924 B2 | 4/2019 | Gu et al. | |
| 2014/0250032 A1 | 9/2014 | Huang et al. | |
| 2014/0336795 A1 | 11/2014 | Asenjo et al. | |
| 2016/0123904 A1* | 5/2016 | Masood | G06K 9/00536 |
| | | | 382/131 |
| 2019/0102621 A1 | 4/2019 | Flohr et al. | |

* cited by examiner

*Primary Examiner* — Juan A Torres
(74) *Attorney, Agent, or Firm* — Klarquist Sparkman, LLP (57) ABSTRACT

Technologies are described for the automated determination of materials. For example, material can be automatically identified (e.g., unique material numbers can be determined) based on sensor data and using machine learning models. In some implementations, as part of a first phase, a first set of sensor information describing the material is obtained. Using the first set of sensor information, a material class of the material is determined. As part of a second phase, a second set of sensor information describing the material is obtained. Using the second set of sensor information, the specific material is identified (e.g., a unique material identifier is determined for the material).

20 Claims, 5 Drawing Sheets

SOFTWARE 580 IMPLEMENTING DESCRIBED TECHNOLOGIES

Figure 6

AUTOMATED DETERMINATION OF MATERIAL IDENTIFIERS FOR MATERIALS USING MACHINE LEARNING MODELS

BACKGROUND

Organizations often receive shipments of materials used in the production of goods. For example, an organization may receive metal materials for use in manufacturing of products for sale. When an organization receives a shipment of materials, the organization needs to know what type of materials are in the shipment. For example, a shipment of agricultural materials (e.g., a shipment of corn or wheat) may not be labeled with the specific material type which would allow the receiver to identify the detailed characteristics of the material or classify the material.

Identifying the specific type of a received material can be a difficult process. For example, a person may have to visually inspect the material to try and determine how to classify the material. Such manual processes can be time consuming and error prone. In other solutions, pre-defined rules can be used to try and identify the materials (e.g., comparing properties of the materials to known ranges). However, such pre-defined rules can be unreliable. For example, the pre-defined rules may contain incorrect ranges or may not be updated to reflect the current properties of the materials.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various technologies are described herein for the automated determination of unique material identifiers for materials. For example, the automated determination of a unique material identifier of a material can comprise receiving a first set of sensor information describing the material, where the first set of sensor information comprises data derived from at least a first sensor. The automated determination can further comprise determining a material class of the material using a first machine learning model and based at least in part on the first set of sensor information. The automated determination can further comprise receiving a second set of sensor information describing the material based on the determined material class, where the second set of sensor information comprises data derived from one or more additional sensors different from the first sensor. The automated determination can further comprise determining a unique material identifier for the material based at least in part on the determined material class of the material and the second set of sensor information, where determining the unique material number uses a second machine learning model different from the first machine learning model. The automated determination can further comprise outputting an indication of the unique material identifier.

In some implementations, the first set of sensor information is used to identify broad characteristics of the material and the second set of sensor information is used to identify detailed characteristics of the material.

DETAILED DESCRIPTION

Overview

The following description is directed to technologies for the automated determination of material. For example, material can be automatically identified (e.g., unique material numbers can be determined) based on sensor data and using machine learning models. In some implementations, as part of a first phase, a first set of sensor information describing the material is obtained. The first set of sensor information is obtained from at least a first sensor (e.g., digital image data obtained from a digital camera sensor). Using the first set of sensor information, a material class of the material is determined. The material class represents a general classification of the material and it encompasses multiple specific materials. As part of a second phase, a second set of sensor information describing the material is obtained. The second set of sensor information is obtained from one or more sensors (e.g., different sensors from at least the first sensor). Using the second set of sensor information, the specific material is identified (e.g., a unique material identifier is determined for the material). Information identifying the specific material (e.g., the unique material identifier) can be output (e.g., sent in an electronic report, saved to a file or database, used to initiate another process, etc.).

For example, the automated material determination technologies described herein can fully automate the determination of the specific type of material being received (e.g., at a delivery center of an organization). For example, a shipment of material (e.g., a shipment of metal products, such as metal sheets, rods, or tubes) can be received at an organization. An automated process can be initiated to determine the specific material being received (e.g., to determine a unique material identifier for the material). The process of determining the specific material being received can be performed in a fully automated manner (e.g., using sensor input and machine learning models) and without any human interaction.

In previous solutions, determination of the specific type of material being received (e.g., determination of material numbers) used a brute-force approach that involved human interaction. In an example previous solution, a person would view the material being received in order to determine a general type of the material. Next, a number of business rules would be evaluated to try and determine the specific material number. For example, consider a scenario in which a manufacturing company A uses sheet metal as a raw material which it purchases from steel company B. Steel company B manufacturers various steel items, including sheets, pipes, and rods in various dimensions, thicknesses, compositions, etc. In a traditional scenario, when material is delivered to company A, a person manually checks the material to determine what it is (e.g., sheets, pipes, or rods). After the broad level classification, the material is tested to determine its detailed characteristics (e.g., thickness, composition, etc.), and then a material number is assigned to the shipment of material. Such previous solutions were relatively slow (e.g., requiring a number of minutes or longer per material), prone to errors, and in some cases required human interaction.

The technologies described herein provide advantages over previous solutions. For example, the automated material determination technologies can automatically determine a unique material identifier for a material without human intervention using sensor input and machine learning models. The automated material determination technologies are more accurate because they do not rely on pre-defined rules (e.g., the machine learning models can be trained with real-world data to accurately distinguish between various classes of materials and between individual materials). The automated material determination technologies are also more efficient. For example, the automated material determination technologies can determine a unique material identifier for a material in a few seconds or less.

Materials

The technologies described herein are applied to the automated determination of materials. A material can be any type of product or good that can be identified as having a unique material identifier that is different from the other unique material identifiers in a given system (e.g., within a given database or ERP system). For example, a business that manufactures products using metal could receive metal materials, such as metal sheets, metal tubes, metal rods, etc. A business that produces food products could receive agricultural materials, such as corn, soybeans, wheat, etc.

Materials can be grouped into classes, where a class of materials (also referred to as a material class) is a broad classification that contains a number of specific materials, each having their own unique material identifier (e.g., unique material number or other type of unique identifier). An example material class is a metal sheet class. The metal sheet material class can encompass numerous specific (unique) metal sheet materials, each having their own characteristics. For example, each specific metal sheet material could be defined by characteristics such as size (e.g., length and width), thickness, composition, flexibility, tensile strength, etc.

Each specific material is associated with its own material identifier. A material identifier (also referred to as a unique material identifier) is used to uniquely identify a specific material and to distinguish the specific material from other materials (e.g., form other materials in the same material class or in different material classes). For example, a specific metal sheet having specific characteristics can be assigned a first material identifier, a second specific metal sheet having specific characteristics (different from the characteristics of the first specific metal sheet) can be assigned a second material identifier (different from the first material identifier), and so on.

The table below, Table 1, depicts example materials. The first column identifies the material class of the material. In this example, there are two materials in the metal sheet class, one material in the metal rod class, and one material in the metal pipe class. The second through fourth columns contain detailed characteristics of the material. The detailed characteristics are depicted as specific values for ease of illustration, but they can also be ranges of values. The fifth column contains the unique material identifier of the material.

TABLE 1

| Class | Composition | Thickness | Tensile strength | Material identifier |
|---|---|---|---|---|
| Metal Sheet | Galvanized | 1.54 | 240 | Sheet_001 |
| Metal Sheet | Stainless 304 | 0.78 | 370 | Sheet_002 |
| Metal Rod | Stainless 302 | 10.2 | 190 | Rod_001 |
| Metal Tube | Titanium | 12.84 | 100 | Tube_1234 |

Sensor Information

The technologies described herein are applied to the automated determination of materials using sensor information (also referred to as sensor data). Sensor information is derived from one or more sensors. Sensor information can comprise data taken directly from a sensor (e.g., a moisture sensor that provides a moisture values, such as a percentage value) and/or processed data based on sensor input (e.g., data derived from image processing of digital images obtained from a digital camera sensor).

Example sensors include imaging sensors (e.g., digital cameras), gauge sensors, weight sensors, density sensors, foreign material sensors, moisture sensors, chemical sensors, etc. Example sensor information includes digital images, processed digital image information, malleability, flexibility, tensile strength, density, weight, thickness, moisture content, etc.

Machine Learning Models

In the technologies described herein, sensor information is processed using machine learning models in order to determine material classes and unique material identifiers. In some implementations, a first machine learning model is used to determine a material class from a first set of sensor information. For example, the first set of sensor information can comprise digital image data (e.g., digital image data that has been processed using image processing techniques). The first machine learning model can be trained (e.g., using a set of training data) to distinguish between classes of materials (e.g., to distinguish between metal sheets, rods, and pipes, or to distinguish between corn, wheat, and soy). In some implementations, the first machine learning model is a convolutional neural network.

In some implementations, a second machine learning model is used to determine a unique material identifier from a second set of sensor information. For example, the second set of sensor information can comprise detailed characteristics of a material. The second machine learning model can be trained (e.g., using a set of training data) to distinguish between specific materials (e.g., to distinguish between different types of metal pipes, or to distinguish between different types of corn kernels). In some implementations, the second machine learning model is an artificial neural network.

Retraining Machine Learning Models

In the technologies described herein, machine learning models can be retrained. For example, machine learning models can be retrained based on changes to materials (e.g., when new materials are added, when materials are updated or deleted, or when material characteristics change). Retraining can also be performed when new data is available. For example, after the classification engine has been running for a period of time, the processed data can be used to retrain the models.

In some implementations, retraining of the machine learning models is performed based on entropy and/or information divergence. For example, when the entropy and/or information divergence of classification results are below threshold values (e.g., indicating that the models are not able to reliably distinguish between materials), then retraining can be triggered. When the entropy and/or the information divergence is below its respective threshold it can indicate that the probabilities are unevenly distributed and that retraining should be considered. For example, consider a classification scenario in which there are four material classes and the machine learning model results in four classification probabilities of −0.56, 0.36, 0.33, and 0.35. In this scenario, the winner is the class with the probability of 0.36. However, the probabilities of 0.33 and 0.35 are very close and can indicate a lack of confidence in the results.

In some implementations, entropy is calculated according to Equation 1 below. Equation 1 calculates entropy of a discrete variable X with possible outcomes $x_1, x_2, x_3, \ldots x_n$. In Equation 1, N is the total number of classes and p(x) is the probability of the $i^{th}$ outcome of X.

$$H_\alpha(\chi) = \frac{1}{1-\alpha} \log_2 \left( \sum_{i=1}^{N} p_i(\alpha) \right) \quad \text{(Equation 1)}$$

In some implementations, information distance (ID) is calculated according to the following equations.

$$D_\alpha(P, Q) = \frac{1}{1-\alpha} \log_2 \left( \sum_{i=1}^{n} p_i^\alpha q_i^{1-\alpha} \right)$$

$$D_0(P, Q) = -\log_2 \left( \sum_{i=1}^{n} q_i \right), \text{ when } \alpha = 1$$

$$D_1(P, Q) = -\sum_{i=1}^{n} p_i \log_2 \left( \frac{p_i}{q_i} \right), \text{ when } \alpha = 2$$

In some implementations, retraining is performed according to the following operations:
1. Obtain the current input to classify and feed the current input into the classification engine (e.g., using the first or second machine learning models).
2. Obtain the probabilities for all classification result from the end layer of the machine learning model.
3. Calculate the entropy and information divergence from the classification results.
4. Normalize the calculated entropy and information divergence.
5. Compare the normalized entropy and normalized information divergence to respective thresholds. For example, the thresholds can be determined empirically.
6. If the normalized entropy and/or normalized information divergence is below its respective threshold, the machine learning model may be retrained (e.g., depending on whether the current input is in the data set for the model). For example, in some implementations, retraining is performed when the current input is not in the set of data for the machine learning model. In some implementations, the machine learning model may be retrained when both the normalized entropy and the normalized information divergence are below their respective thresholds.
7. Otherwise, if the normalized entropy and/or normalized information divergence is above its respective threshold, retraining is not performed. In some implementations, the machine learning model is not retrained when both the normalized entropy and the normalized information divergence are above their respective thresholds.

To illustrate how the above operations are performed, consider an example model M1 that is trained with a classification engine (e.g., using softmax at the end layer) using the following training data set to distinguish between three different material classes.
<0.12,0.33,0.54,0.6>—Material class 1
<0.19,0.41,0.78,0.54>—Material class 2
<0.55, 0.67,0.88,0.11>—Material class 3
<0.67,0.91,0.34,0.42>—Material class 1

According to operation 1, the following current input to the model M1 is received: <0.12,0.42,0.53,0.11>. According to operation 2, the current input <0.12,0.42,0.53,0.11> yields the following probabilities from the model M1:
Material class 1: 0.33
Material class 2: 0.23
Material class 3: 0.34

According to these results, the current input will be classified as material class 3 (which has the highest probability). However material class 1 is also very close with a probability of 0.33.

Next, according to operations 3 and 4, normalized entropy and normalized information divergence are calculated according to the above equations. Then, according to operation 5, the normalized entropy and normalized information divergence are compared to respective thresholds (e.g., which are determined empirically).

According to operation 6, if the normalized entropy and/or normalized information divergence are below their respective thresholds, then retraining may be performed. If this is the case, then the current input <0.12,0.42,0.53,0.11> is compared to the data set for the model M1. Because the current input is not in the data set for model M1, retraining would be triggered.

According to operation 7, if the normalized entropy and/or normalized information divergence are above their respective thresholds, then retraining is not performed.

Retraining of the machine learning model(s) can be triggered based on a variety of criteria. For example, results of the machine learning model(s) can be checked on a periodic basis and retrained if needed. Results of machine learning model(s) can also be checked for every classification result and retrained if needed.

Service Environment for Automated Determination of Unique Material Identifiers

Figure 1:
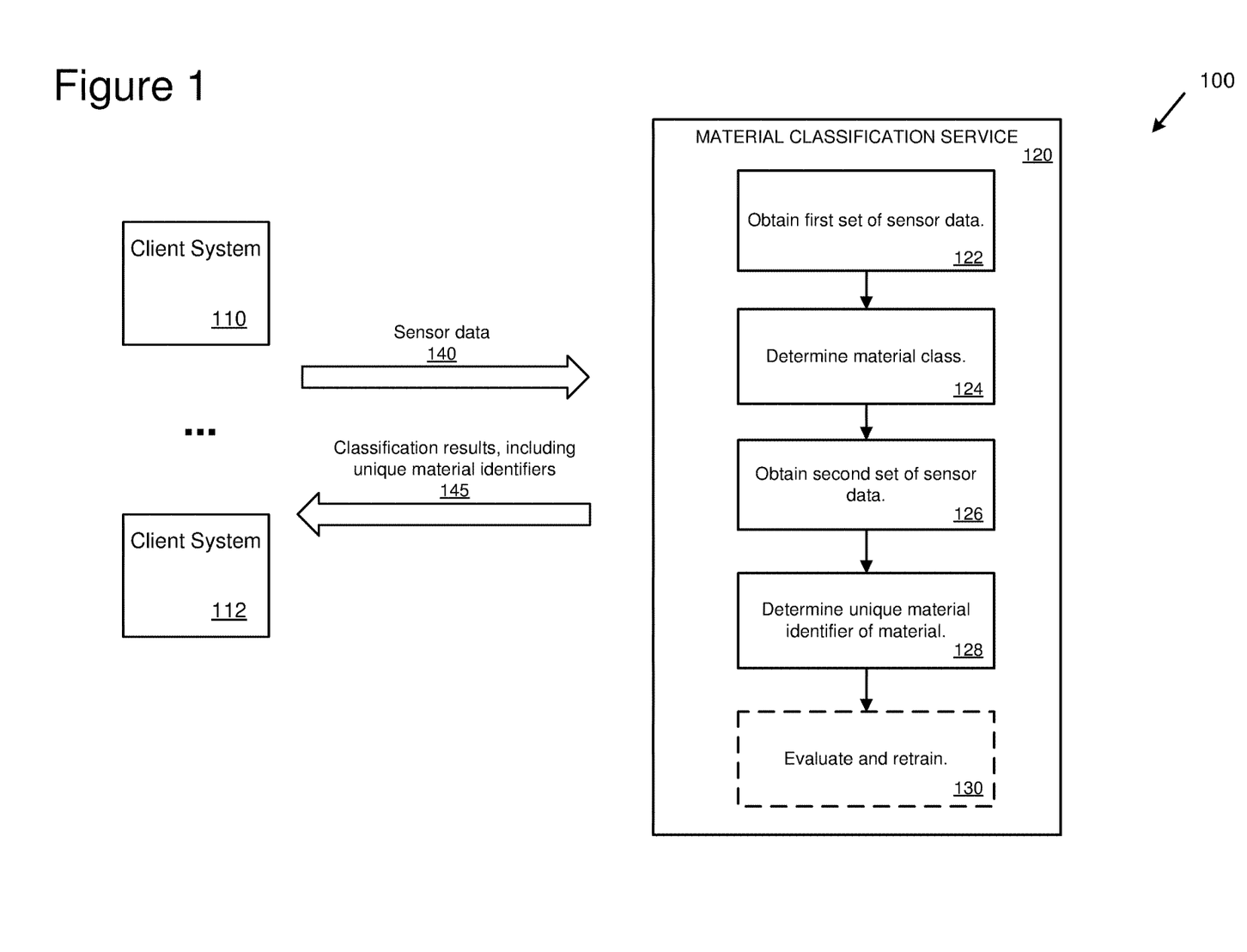
FIG. 1 is a diagram depicting an example service environment for automated determination of unique material numbers.

FIG. 1 is a diagram depicting an example service environment 100 for automated determination of unique material identifiers. The example service environment 100 includes a number of client systems, represented by two example client systems 110 and 112. The client systems can be operated by the same organization or by different organizations. The client systems are involved with the determination of materials. For example, client system 110 could be a system (e.g., comprising server resources, database resources, storage resources, software resources, etc.) of an organization that is involved with the receiving of materials. In some implementations, the client systems are ERP systems.

The example environment 100 also includes a material classification service 120. The material classification service 120 can be implemented by a variety of server resources, database resources, storage resources, software resources, and/or other types of computing resources. The material classification service 120 provides classification services to the client systems, including client systems 110 and 112.

A classification process is initiated when one of the client systems sends a request to classify a material to the material classification service 120. The request includes sensor data, which is indicated at 140. For example, if client system 110 receives a shipment of metal material (e.g., metal sheets), the client system 110 can send a request, comprising sensor data (e.g., digital image data of the metal material and/or sensor data describing other characteristics or properties of the metal material such as thickness, weight, composition, etc.), to the material classification service 120. In some implementations, the sensor data 140 comprises a first set of sensor data (e.g., describing broad characteristics of the material, which can be derived from a first set of sensors) and a second set of sensor data (e.g., describing detailed characteristics of the material, which can be derived form a second set of sensors).

The material classification service 120, upon receiving a request to classify a material, performs a number of operations. In some implementations, the material classification service 110 uses a two-stage approach. In the first stage, a first set of sensor data is obtained, as depicted at 122. The first set of sensor data originates from the client system. The material classification service 120 then determines a material class of the material using based on the first set of sensor data, as depicted at 124. For example, the material class can be determined using a first machine learning model. The material class represents a general classification of the material. For example, different material classes for metal material could be metal sheets, metal rods, and metal tubes. In the second stage, a second set of sensor data is obtained, as depicted at 126. The second set of sensor data originates from the client system. The material classification service 120 then determines a unique material identifier for the material based on the material class (as determined at 124) and the second set of sensor data, as depicted at 128. For example, the unique material identifier can be determined using a second machine learning model. For example, the metal material can be determined to be unique material identifier M12345 (e.g., a specific type of steel sheet having specific dimensions, composition, etc.). As depicted at 145, results of the classification are returned to the client systems. For example, the unique material number can be returned to the requesting client system.

In some implementations, the material classification service 120 evaluates results of the classification process and retrains the system if needed, as depicted at 130. For example, machine learning models can be retrained based on various triggers (e.g., when new materials are added to the system, when materials are updated or deleted, or when material characteristics change). In some implementations, the ability of the material classification service 120 to distinguish between materials is tested and the machine learning models are retrained when needed. For example, entropy and information divergence calculations can be performed for classification results and compared to threshold values. Depending on the results of the comparison (e.g., when the results indicate that the process is not able to distinguish between materials with a high degree of confidence), the machine learning models can be retrained.

The example service environment 100 supports any number of client systems, which can operate within a local network or a remote network. In a local network environment, the client systems (e.g., client system 110 and 112) can communicate over local area networks with the material classification service 120. For example, the local environment could be operated by a specific organization (e.g., a specific business). In a remote network environment, the client systems can communicate over networks including wide area networks (e.g., over the Internet) with the material classification service 120.

In some implementations, the material classification service 120 operates as a remote (e.g., cloud) service (e.g., as a platform-as-a-service (PaaS)) in which the client systems connect via a network connection (e.g., via the Internet). For example, client system 110 can be a client system of a first organization that operates in a remote location from the material classification service 120 and client system 112 can be a client system of a second organization that operates in a different remote location from the material classification service 120. In this way the material classification service 120 can support any number of client systems, and each client system can be operated by a different organization.

Environment for Automated Determination of Unique Material Identifiers

Figure 2:
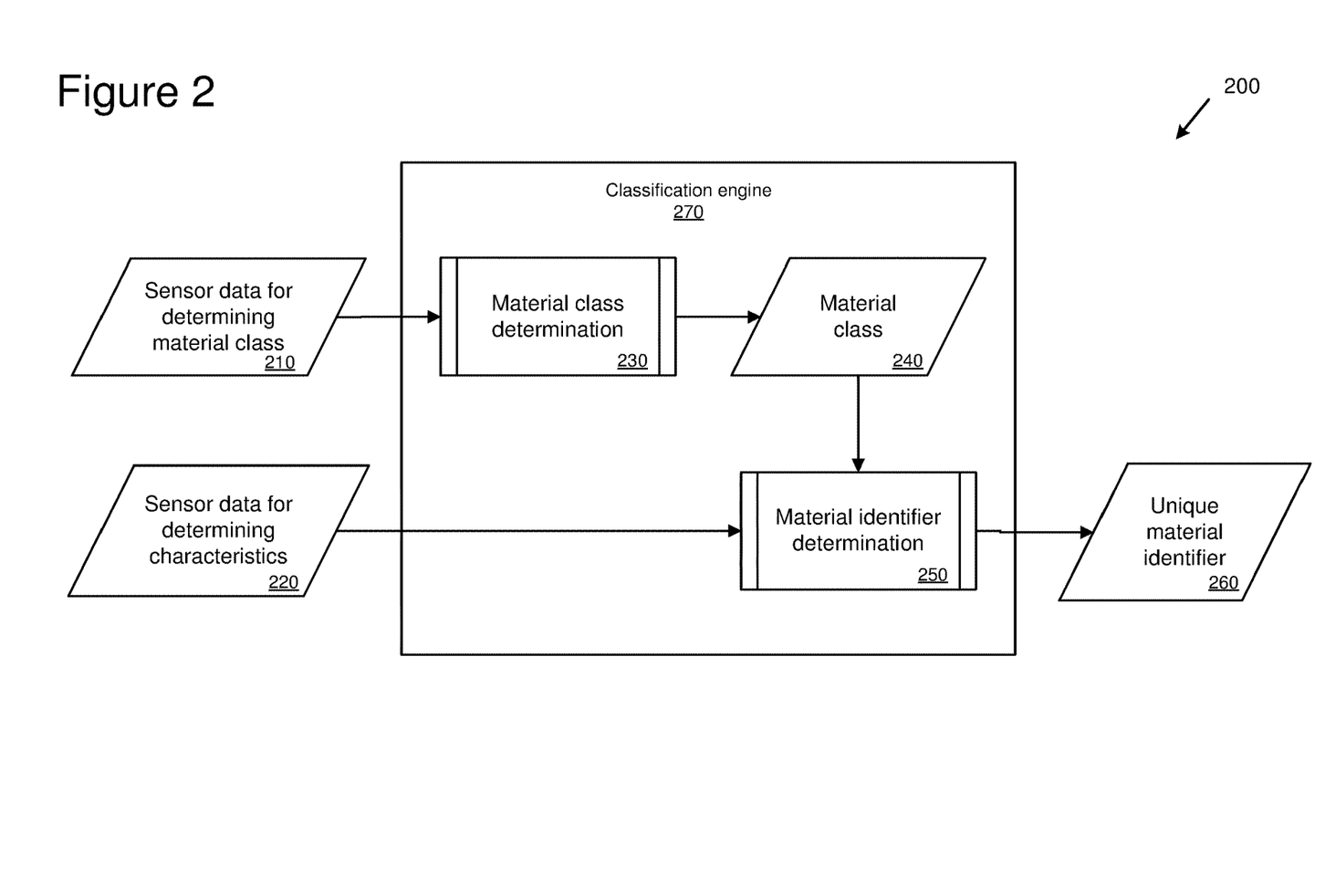
FIG. 2 is a diagram depicting an example environment for automated unique material number determination.

FIG. 2 is a diagram depicting an example procedure 200 for automated unique material number determination. The example procedure 200 can be performed by software and/or hardware resources (e.g., as part of a cloud service). For example, the example procedure 200 can be performed by a service, such as the material classification service 120.

As depicted, the automated determination of unique material numbers is performed by a classification engine 270. The classification engine 270 performs the classification procedure in two stages. In the first stage, a material class determination component 230 receives sensor data for determining a material class of a material (e.g., an incoming shipment of a material, such as a shipment of steel rods, a shipment of corn, etc.), as depicted at 210. The sensor data for determining the material class can be received as a first set of sensor data (e.g., derived from a digital camera sensor). The material class determination component 230 processes the received sensor data to determine a material class 240 of the material.

In the second stage, a material identifier determination component 250 receives additional sensor data for determining detailed characteristics of the material, as depicted at 220. The sensor data for determining detailed characteristics can be received as a second set of sensor data (e.g., derived from additional sensors). The material identifier determination component 250 processes the received additional sensor data based on the material class and determines a unique material identifier 260 for the material.

Methods for Automated Determination of Unique Material Identifiers

In the technologies described herein, methods can be provided for automated determination of unique material numbers. For example, hardware and/or software elements can perform operations to automatically determine unique material numbers without manual intervention by a person. For example, the automated determination can be performed by a classification engine, such as classification engine 270.

Figure 3:
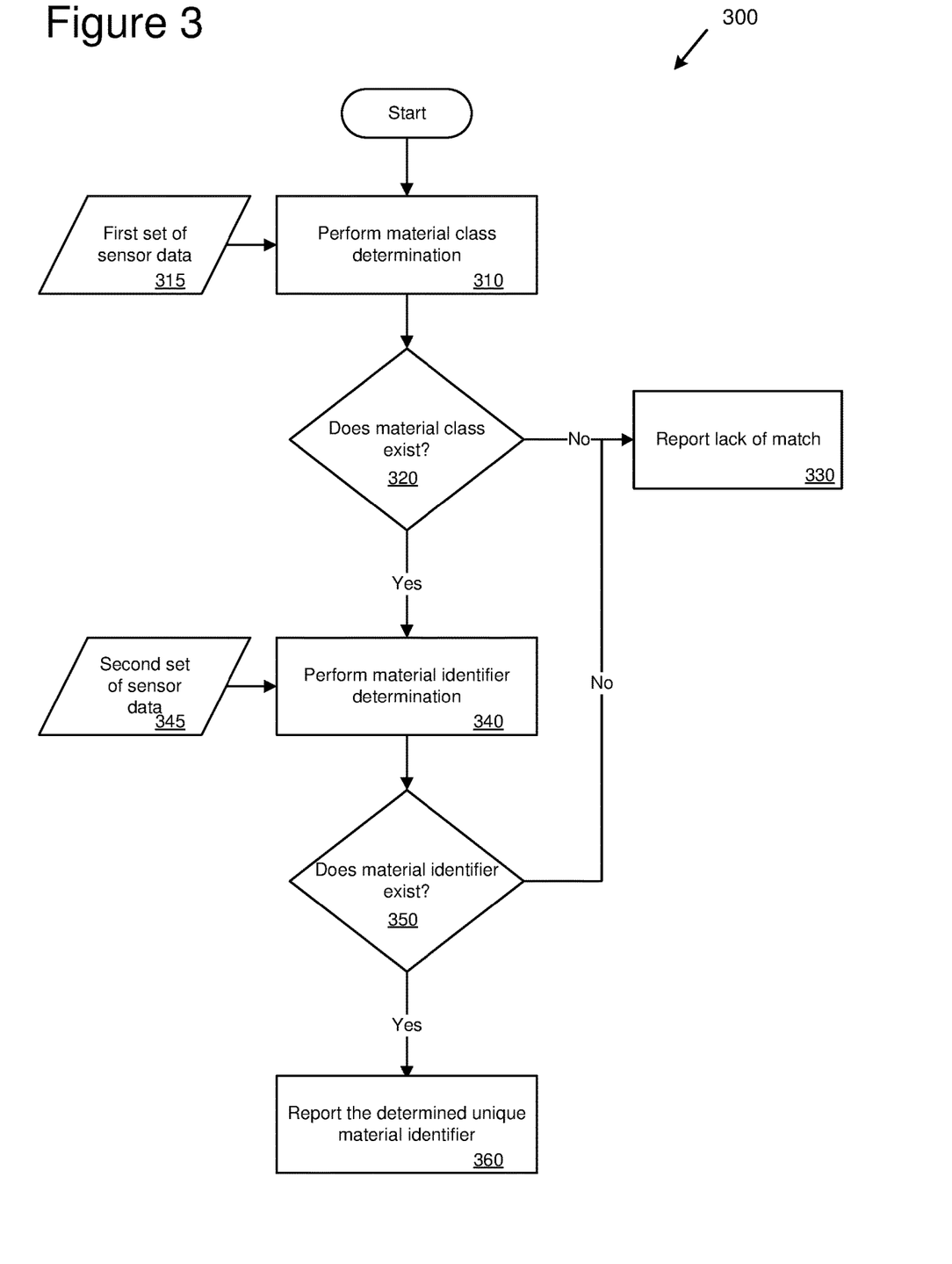
FIG. 3 is a flowchart of an example process for automated determination of unique material numbers.

FIG. 3 is a flowchart depicting an example process 300 for automated determination of unique material numbers. The example process 300 first tries to determine the material class of the material, as depicted at 310, using a first set of sensor data 315. The material class is determined using a first machine learning model (e.g., a convolution neural network). If there is a matching material class for the material (e.g., if a material class is found, in a database of material classes, that matches the first set of sensor data), then the example process 300 proceeds (the "yes" branch from 320) to determine the unique material identifier. However, if there is no matching material class for the material (the "no" branch from 320), then the example process 300 proceeds to 330 where the error is reported. For example, the error can be reported to a person (e.g., a person managing receipt of the materials), saved to a log file, or reported in another manner.

If the material class of the material is determined, the example process 300 tries to determine the unique material identifier of the material, as depicted at 340. Determination of the unique material identifier is based on the material class and the second set of sensor data 345. For example, the specific sensors (and associated characteristics) that are used to determine the unique material identifier can be selected based on the material class (e.g., a material class for an agricultural product such as corn or wheat could use one set of sensors, including a moisture sensor, while a material class for an industrial product such as metal sheets could use a different set of sensors, including a thickness sensor). The unique material identifier is determined using a second machine learning model (e.g., an artificial neural network). If there is a matching unique material identifier for the material (e.g., if a unique material identifier is found, in a database of unique material identifiers, that matches the second set of sensor data), then the example process 300 proceeds (the "yes" branch from 350) to 360 to report the unique material number (e.g., to send a message, to associate the materials with the unique material identifier, to store the result in a log file, etc.). However, if there is no matching unique material identifier for the material (the "no" branch from 350), then the example process 300 proceeds to 330 where the error is reported.

Figure 4:
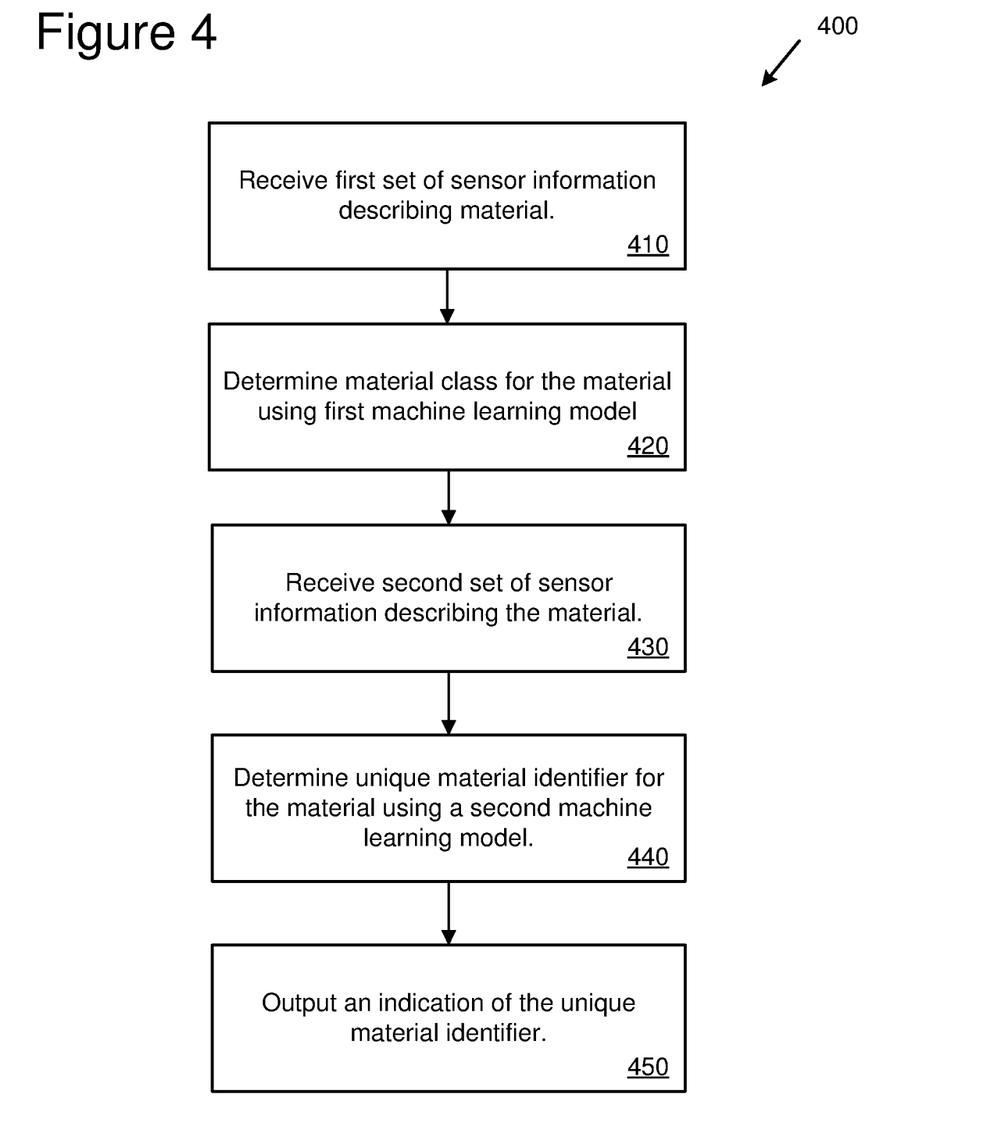
FIG. 4 is a is a flowchart of an example method for automated determination of unique material numbers.

FIG. 4 is a flowchart of an example method 400 for automated determination of unique material numbers. For example, the example method 400 can be performed by a classification engine, such as classification engine 270.

At 410, a first set of sensor information is received describing a material. The first set of sensor information comprises data derived from at least a first sensor. In some implementations, the first set of sensor information comprises data derived from a digital imaging sensor (e.g., a digital camera), and can comprise information derived from other sensors as well. The first set of sensor information describes broad characteristics of the material. For example, the first set of sensor information can comprise data from image processing operations performed on digital images of the material.

At 420, a material class is determined for the material using a first machine learning model. For example, the first machine learning model receives the first set of sensor information as input and outputs an indication of the material class (e.g., as a set of probabilities for possible material classes, with the highest probability selected as the determined material class).

At 430, a second set of sensor information describing the material is received. The second set of sensor information comprises data derived from one or more additional sensors that are different from at least the first sensor (e.g., different form the digital imaging sensor). The second set of sensor information describes detailed characteristics of the material (e.g., weight, thickness, moisture content, etc.). The second set of sensor information that is obtained can be based on the determined material class. For example, specific material classes can be associated with specific sensors and/or the specific characteristics that need to be measured.

At 440, a unique material identifier is determined for the material using a second machine learning model that is different from the first machine learning model. For example, the second machine learning model receives the second set of sensor information as input and outputs an indication of the unique material identifier (e.g., as a set of probabilities for possible unique material identifiers, with the highest probability selected as the determined unique material identifier).

At 450, an indication of the unique material identifier is output. For example, the unique material identifier can be reported or saved (e.g., to a log file or database). Other information can be output as well, such as classification probabilities, error results, etc.

In some implementations, one or both of the machine learning models can be retrained. For example, retraining can be performed based on calculated entropy and/or information divergence.

In some implementations, only a digital camera sensor is used to provide the first set of sensor information, and the digital camera sensor is not used for the second set of sensor information.

Computing Systems

Figure 5:
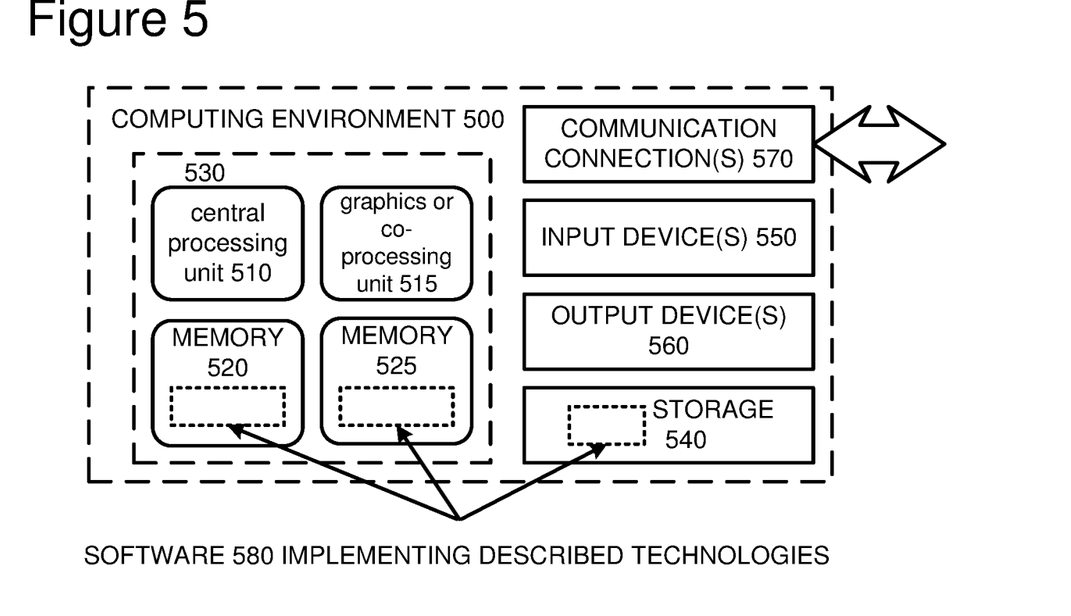
FIG. 5 is a diagram of an example computing system in which some described embodiments can be implemented.

FIG. 5 depicts a generalized example of a suitable computing system 500 in which the described innovations may be implemented. The computing system 500 is not intended to suggest any limitation as to scope of use or functionality, as the innovations may be implemented in diverse general-purpose or special-purpose computing systems.

With reference to FIG. 5, the computing system 500 includes one or more processing units 510, 515 and memory 520, 525. In FIG. 5, this basic configuration 530 is included within a dashed line. The processing units 510, 515 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 5 shows a central processing unit 510 as well as a graphics processing unit or co-processing unit 515. The tangible memory 520, 525 may be volatile memory (e.g., registers, cache, RAM), non-volatile memory (e.g., ROM, EEPROM, flash memory, etc.), or some combination of the two, accessible by the processing unit(s). The memory 520, 525 stores software 580 implementing one or more innovations described herein, in the form of computer-executable instructions suitable for execution by the processing unit(s).

A computing system may have additional features. For example, the computing system 500 includes storage 540, one or more input devices 550, one or more output devices 560, and one or more communication connections 570. An interconnection mechanism (not shown) such as a bus, controller, or network interconnects the components of the computing system 500. Typically, operating system software (not shown) provides an operating environment for other software executing in the computing system 500, and coordinates activities of the components of the computing system 500.

The tangible storage 540 may be removable or non-removable, and includes magnetic disks, magnetic tapes or cassettes, CD-ROMs, DVDs, or any other medium which can be used to store information in a non-transitory way and which can be accessed within the computing system 500. The storage 540 stores instructions for the software 580 implementing one or more innovations described herein.

The input device(s) 550 may be a touch input device such as a keyboard, mouse, pen, or trackball, a voice input device, a scanning device, or another device that provides input to the computing system 500. For video encoding, the input device(s) 550 may be a camera, video card, TV tuner card, or similar device that accepts video input in analog or digital form, or a CD-ROM or CD-RW that reads video samples into the computing system 500. The output device(s) 560 may be a display, printer, speaker, CD-writer, or another device that provides output from the computing system 500.

The communication connection(s) 570 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Cloud Computing Environment

Figure 6:
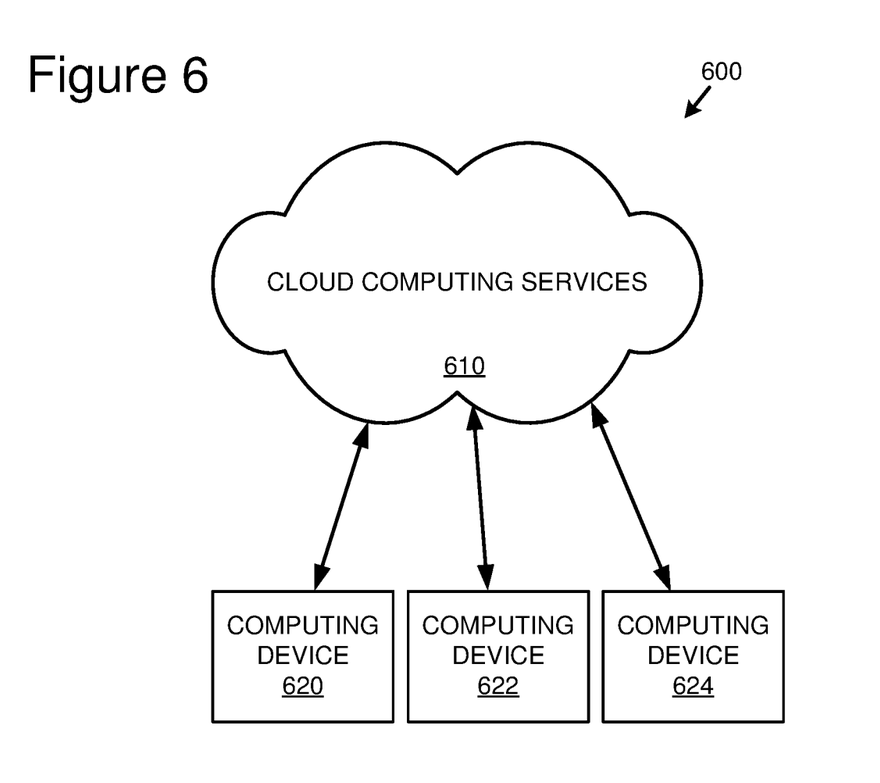
FIG. 6 is an example cloud computing environment that can be used in conjunction with the technologies described herein.

FIG. 6 depicts an example cloud computing environment 600 in which the described technologies can be implemented. The cloud computing environment 600 comprises cloud computing services 610. The cloud computing services 610 can comprise various types of cloud computing resources, such as computer servers, data storage repositories, database resources, networking resources, etc. The cloud computing services 610 can be centrally located (e.g., provided by a data center of a business or organization) or distributed (e.g., provided by various computing resources located at different locations, such as different data centers and/or located in different cities or countries).

The cloud computing services 610 are utilized by various types of computing devices (e.g., client computing devices), such as computing devices 620, 622, and 624. For example, the computing devices (e.g., 620, 622, and 624) can be computers (e.g., desktop or laptop computers), mobile devices (e.g., tablet computers or smart phones), or other types of computing devices. For example, the computing devices (e.g., 620, 622, and 624) can utilize the cloud computing services 610 to perform computing operators (e.g., data processing, data storage, and the like).

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (i.e., any available computing device, including smart phones or other mobile devices that include computing hardware). Computer-readable storage media are tangible media that can be accessed within a computing environment (one or more optical media discs such as DVD or CD, volatile memory (such as DRAM or SRAM), or nonvolatile memory (such as flash memory or hard drives)). By way of example and with reference to FIG. 5, computer-readable storage media include memory 520 and 525, and storage 540. The term computer-readable storage media does not include signals and carrier waves. In addition, the term computer-readable storage media does not include communication connections, such as 570.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A method, performed by one or more computing devices, for automated determination of unique material identifiers, the method comprising:
   receiving a first set of sensor information describing material, wherein the first set of sensor information comprises data derived from at least a first sensor;
   determining a material class of the material using a first machine learning model and based at least in part on the first set of sensor information;
   based on the determined material class, receiving a second set of sensor information describing the material, wherein the second set of sensor information comprises data derived from one or more additional sensors different from the first sensor;
   determining a unique material identifier for the material based at least in part on the determined material class of the material and the second set of sensor information, wherein determining the unique material identifier uses a second machine learning model different from the first machine learning model; and
   outputting an indication of the unique material identifier.

2. The method of claim 1, wherein the first set of sensor information is used to identify broad characteristics of the material.

3. The method of claim 1, wherein the first sensor is a digital camera, and where the first set of sensor information comprises digital image data.

4. The method of claim 1, wherein the first machine learning model is a convolutional neural network.

5. The method of claim 1, wherein the second set of sensor information is used to identify detailed characteristics of the material.

6. The method of claim 1, wherein the second machine learning model is an artificial neural network.

7. The method of claim 1, wherein the one or more additional sensors are selected based on the determined material class, and wherein different material classes are associated with respective different one or more additional sensors.

8. The method of claim 1, wherein the one or more additional sensors comprise one or more of:
   a gauge sensor;
   a weight sensor;
   a density sensor; or
   a moisture sensor.

9. The method of claim 1, wherein the second set of sensor information indicates one or more of the following detailed characteristics of the material:
   thickness;
   density;
   weight;
   diameter;
   composition; or
   moisture content.

10. The method of claim 1, further comprising:
    retraining one or both machine learning models when calculated entropy and calculated information divergence are below respective thresholds.

11. The method of claim 1, further comprising:
    calculating entropy of probabilities from one or both of the first machine learning model or the second machine learning model;
    calculating information divergence from one or both of the first machine learning model or the second machine learning model;
    comparing the entropy and information divergence to one or more thresholds; and
    based on the comparison, deciding whether to retrain one or both of the first machine learning model or the second machine learning model.

12. One or more computing devices comprising:
    processors; and
    memory;
    the one or more computing devices configured, via computer-executable instructions, to perform operations for automated determination of unique material identifiers, the operations comprising:
       receiving a first set of sensor information describing material, wherein the first set of sensor information comprises data derived from at least a first sensor, wherein the first sensor is a digital imaging sensor, and wherein the first set of sensor information is used to identify broad characteristics of the material;
       determining a material class of the material using a first machine learning model and based at least in part on the first set of sensor information;
       based on the determined material class, receiving a second set of sensor information describing the material, wherein the second set of sensor information comprises data derived from one or more additional sensors different from the first sensor, and wherein the second set of sensor information is used to identify detailed characteristics of the material;
       determining a unique material identifier for the material based at least in part on the determined material class of the material and the second set of sensor information, wherein determining the unique material identifier uses a second machine learning model different from the first machine learning model; and outputting an indication of the unique material identifier.

13. The one or more computing devices of claim 12, wherein the first sensor is a digital camera, and where the first set of sensor information comprises data derived from image processing.

14. The one or more computing devices of claim 12, wherein the first machine learning model is a convolutional neural network, and wherein the second machine learning model is an artificial neural network.

15. The one or more computing devices of claim 12, wherein the operations are performed without any manual interaction.

16. The one or more computing devices of claim 12, wherein the one or more additional sensors are selected based on the determined material class, and wherein different material classes are associated with respective different one or more additional sensors.

17. The one or more computing devices of claim 12, the operations further comprising:
retraining one or both machine learning models when calculated entropy and calculated information divergence are below respective thresholds.

18. The one or more computing devices of claim 12, the operations further comprising:
calculating entropy of probabilities from one or both of the first machine learning model or the second machine learning model;
calculating information divergence from one or both of the first machine learning model or the second machine learning model; and
comparing the entropy and information divergence to one or more thresholds; and
based on the comparison, deciding whether to retrain one or both of the first machine learning model or the second machine learning model.

19. One or more non-transitory computer-readable storage media storing computer-executable instructions for execution on one or more computing devices to perform operations for automated determination of unique material identifiers, the operations comprising:
receiving a first set of sensor information describing material, wherein the first set of sensor information comprises data derived from at least a first sensor, wherein the first sensor is a digital imaging sensor, and wherein the first set of sensor information is used to identify broad characteristics of the material;
determining a material class of the material using a first machine learning model and based at least in part on the first set of sensor information;
based on the determined material class, receiving a second set of sensor information describing the material, wherein the second set of sensor information comprises data derived from one or more additional sensors different from the first sensor, and wherein the second set of sensor information is used to identify detailed characteristics of the material;
determining a unique material identifier for the material based at least in part on the determined material class of the material and the second set of sensor information, wherein determining the unique material identifier uses a second machine learning model different from the first machine learning model; and
outputting an indication of the unique material identifier.

20. The one or more non-transitory computer-readable storage media of claim 19, wherein the first machine learning model is a convolutional neural network, and wherein the second machine learning model is an artificial neural network.

* * * * *